Patent 3,361,688 — Jan. 2, 1968

PRODUCTION OF MOLDINGS OF FINELY DIVIDED, ORGANOSILOXANOL COATED, EXPANDED STYRENE POLYMERS AND CEMENT

Eckhard Bonitz, Frankenthal, Pfalz, and August Rettig, Ludwigshafen (Rhine), Germany, assignors to Badische Anilin- & Soda-Fabrik Aktiengesellschaft, Ludwigshafen (Rhine), Germany
No Drawing. Filed Aug. 14, 1964, Ser. No. 389,793
Claims priority, application Germany, Aug. 17, 1963, B 73,157
4 Claims. (Cl. 260—2.5)

This invention relates to a process for the production of moldings of finely divided expanded styrene polymers and cement. More specifically, the invention relates to a process of the production of moldings of the said kind in which the finely divided styrene polymers used are coated with organosiloxanols.

It is known that mixtures of finely particled thermoplastics, particularly of foam polystyrene, and hydraulic binders, such as cement, lime or gypsum, may be used for the production of light building elements. In this prior art method, the plastics particles are mixed with cement and water, the mixture is introduced into a mold and allowed to set. It has been found that difficulties may arise owing to the poor wettability of the plastics particles, particularly when mixtures are used which have a high content of plastics particles. For example the plastic/cement mixture may separate out for each other before setting takes place.

We have now found that moldings of finely particled expanded styrene polymers, cement and water can be prepared particularly advantageously by mixing with cement, water and if desired aggregate, particles of expanded styrene polymers whose surface has been coated with an organosiloxanol, molding the mixtures and allowing them to set.

Particles of expanded styrene polymers having a mean diameter of about 0.1 to 20 mm. and a density of 10 to 100 kg./m.$^3$ are suitable for the process. In principle, the process may also be used for smaller or larger particles having lower or higher densities. "Expanded" means having a fine cellular structure. Expanded styrene polymers have predominantly closed cells.

Styrene polymers within the scope of the present invention include polystyrene itself and also copolymers of styrene containing at least 50% by weight of polymerized styrene units. Examples of suitable comonomers are acrylonitrile, acrylic or methacrylic esters of alcohols having one to eight carbon atoms and N-vinyl compounds, such as N-vinylcarbazol. Small amounts of divinylbenzene may also be used as a comonomer. The expanded finely particled styrene polymers may be obtained for example by heating finely particled styrene polymers containing an expanding agent. Finely particled styrene polymers which have been obtained by size reduction of larger moldings of expanded styrene polymers may also be used for the process in the same way. The particles may also be in the form of beads, flakes, small rods or fibers.

The surface of the expanded finely particled styrene polymers is coated with an organosiloxanol having the general formula:

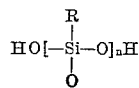

in which $n$ denotes one of the numbers from 1 to 250, preferably 5 to 80 and R denotes an alkyl or alkenyl group having one to six carbon atoms or an aryl group; R is preferably a methyl group, ethyl group, vinyl group, allyl group, or phenyl group. In other words, the organosiloxanols are either monoorganosilane-triols ($n=1$) or oligomers of these compounds ($n=2$ to 250).

The surface of the expanded finely particled styrene polymers may be coated with the organosiloxanols in various ways. For example liquid monoorganosilanetriols may be applied in substance or in solution to the particles. Examples of suitable solvents are water, alcohols and mixtures of water and alcohols. The monoorganosilanetriols condense on the surface of particles so that oligomeric organosiloxanols having the formula given above are formed. Organosiloxanols may however also be applied in substance, solution or dispersion to the particles of expanded styrene polymers in the same way. Sometimes it is advantageous to apply monoorganosilanetriols or organosiloxanols to unexpanded particles of styrene polymers and then to expand the particles under the action of heat.

The particles of expanded styrene polymers coated with organosiloxanols are advantageously first mixed with cement and then the necessary amount of water is added and any aggregate which is to be used. All types of cement conventionally used in the building industry may be used for the process.

By cement we mean Portland cement.

Suitable aggregates are for example sand, pumice, vermiculite or asbestos in finely divided form.

The mixture of expanded finely particled styrene polymer whose surface has been coated with organosiloxanol, cement, water and any aggregate used contains 0.2 to 100 kg. of expanded finely particled styrene polymer per cubic meter of mixture. 25 to 1000 kg. of cement per cubic meter is contained in the mixture. The surface of the styrene polymer particles is coated with 0.1 to 10 kg. of organosiloxanol per cubic meter of the mixture. The mixture may contain 10 to 2000 kg. of aggregate per cubic meter. The mixture contains water in the amounts conventionally used for Portland cement mixtures. The water/cement ratio may vary within certain limits. These limits are known. They may be taken from text books and tables (for example "The Chemistry of Cement and Concrete," F. M. Lea London, Edward Arnold Publishers Ltd. 1956). The water/cement ratio (W/C ratio for short) may be advantageously between 0.3 and 0.8.

The mixtures may be shaped by the methods conventionally used in the production of moldings, for example bricks or boards. The mixtures may, for example, be introduced into simple wooden molds and removed immediately after molding. The mixtures may also be shaped into ribbon-shaped strands by means of an extruder and then cut into boards or other moldings.

The mixtures are advantageously allowed to set at room temperature. Setting can be accelerated in known manner by heating, for example with steam or hot air or in a high-frequency field. The same practices and rules apply for the production of moldings from cement, water and aggregates (cf. the text book mentioned above).

Moldings prepared by the process according to this invention have particularly good strength properties. Owing to the good bond between the particles of expanded styrene polymer coated with organosiloxanols and the cement, a particularly large percentage of styrene polymer may be introduced into the mixture (concrete). It has been found to be particularly advantageous that the mixtures do not separate into their components either during manufacture or setting. Light building bricks or boards may therefore be prepared with great advantage by the process according to this invention.

The invention is further illustrated by the following examples.

Example 1

In each of a number of experiments, 20 kg. of polystyrene beads containing 7% of pentane as expanding agent is introduced into a mixing drum. A definite amount of an organosiloxanol, dissolved in a solvent, is then sprayed onto the particles. Steam (0.1 atmosphere gauge) is blown into the mixture until the particles have been expanded to a mean density of 20 kg./m.$^3$ and the solvent has evaporated. Portland cement (type 375), quartz sand (mixture of 3 parts having a granule size of 1 mm. and 1 part having a granule size of 0.1 to 0.3 mm.) and finally water are added. The mixture is introduced into molds (20 x 20 x 70 cm.). The moldings are kept moist for twenty-eight days. Moldings having high compressive strength are obtained. The results are set out in Table 1:

Example 2

In a series of experiments, definite amounts of a finely particled expanded styrene polymer are sprayed with a solution of an organosiloxanol in a concrete mixer. Hot air is then passed through the mixer until the solvent has evaporated. Portland cement and if desired aggregate is added, the whole mixed and water added. The mixtures are molded as described in Example 1. The moldings are then stored for twenty-eight days in a moist atmosphere. The results are collected in Table 2.

TABLE 2

| | Mixture number | | | | | |
|---|---|---|---|---|---|---|
| | 4 | 5 | 6 | 7 | 8 | 9 |
| Styrene polymer | Polystyrene | Polystyrene | Polystyrene | Copolymer [1] | Copolymer [1] | Copolymer.[1] |
| Shape and diameter in mm | Flake, 0.1–6 | Flake, 4–10 | Flake, 4–10 | Flake, 1–6 | Flake, 1–6 | Flake, 1–6. |
| Density (kg./m.$^3$) | 40 | 40 | 40 | 30 | 100 | 75. |
| Amount in kg | 40 | 40 | 40 | 40 | 100 | 40. |
| Amount of cement in kg | 50 | 100 | 200 | 200 | 200 | 400. |
| Amount of water in kg | 20 | 40 | 80 | 80 | 80 | 160. |
| Aggregate | | | | Sand | Sand | Sand. |
| Amount in kg | | | | 100 | 600 | 1200. |
| Organosiloxanol | Vinyl siloxanol | Propyl siloxanol | Butyl siloxanol | Allyl siloxanol | Monoethylsilanetriol | Phenyl siloxanol. |
| n in the formula | About 200 | 50 | 60 | 100 | | 50. |
| Dissolved in | Methanol | Propanol | Butanol | Methanol | Ethanol | Methanol. |
| Kg | 0.5 | 3 | 0.5 | 0.5 | 0.3 | 0.2. |
| Density of molding in kg./liter | 0.09 | 0.150 | 0.24 | 0.34 | 0.90 | 1.64. |

[1] 80 parts of styrene and 10 parts of acrylonitrile.

Example 3

In the manner described in Example 2, definite amounts of an expanded styrene polymer whose spherical particles have a density of 10 kg./m.$^3$ and a mean particle diameter of 0.1 to 1 mm. are first coated with an organosiloxanol and, after the solvent has been evaporated, mixed with Portland cement, aggregate and water. The mixtures are molded as described in Example 1. The shaped articles are stored for twenty-eight days in a moist atmosphere.

The results are reproduced in Table 3.

TABLE 3

| | Mixture number | | | |
|---|---|---|---|---|
| | 10 | 11 | 12 | 13 |
| Styrene polymer | Copolymer 95% styrene, 5% N-vinyl-carbazol. | Copolymer 95% styrene, 5% methyl methacrylate. | Copolymer 99.8% styrene, 0.2% di-vinylbenzene. | Polystyrene. |
| Amount (kg.) | 15 | 15 | 0.2 | 5. |
| Amount of Portland cement (kg.) | 360 | 360 | 500 | 250. |
| Water (kg.) | 145 | 145 | 200 | 100. |
| Aggregate, amount (kg.) | Sand 540 | Vermiculite 365 | Pumice 1,600 | Asbestos 800. |
| Organosiloxanol, n has meaning in formula | Monoethylsilanetriol. | Propyl siloxanol n=30. | Phenyl siloxanol n=50. | Methyl siloxanol n=40. |
| Amount (kg.) | 0.6 | 0.1 | 0.4 | 0.6. |
| Dissolved in | Propanol | Methanol | Methanol | Methanol. |
| Amount (kg.) | 0.2 | 0.04 | 0.1 | 0.2. |
| Density molding (kg./liter) | 0.9 | 0.74 | 2.1 | 1.5. |
| Compressive strength, kg./cm.$^2$ | 60 | 25 | | |
| Flexural strength, kg./cm.$^2$ | 16 | 12 | | |

TABLE 1

| | Mixture number | | |
|---|---|---|---|
| | 1 | 2 | 3 |
| Amount of expanded polystyrene in kg | 20 | 20 | 20 |
| Density (kg./m.$^3$) | 20 | 20 | 20 |
| Amount of Portland cement in kg | 320 | 270 | 430 |
| Amount of water in kg | 130 | 113 | 170 |
| Amount of aggregate (sand) in kg | 480 | 400 | 640 |
| Organosiloxanol (n having the meaning given in the formula above) in kg. dissolved in the amount of solvent specified in kg | [1] 1.4 | [2] 0.8 | [3] 1.2 |
| Density of the molding (kg./liter) | 0.82 | 0.69 | 1.09 |
| Compressive strength (kg./cm.$^2$) | 50 | | |

[1] Methyl siloxanol, n=100, propanol 0.8.
[2] Ethyl siloxanol, n=25, ethanol 0.5.
[3] Butenyl siloxanol, n=30, propanol butanol 0.7.

We claim:

1. A process for the production of moldings from particles of expanded styrene polymers, cement and water which comprises mixing particles of expanded styrene polymers whose surfaces have been coated with an organosiloxanol having the general formula:

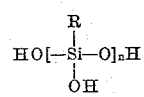

in which $n$ is one of the numbers 1 to 250 and R denotes a member selected from the class consisting of an alkyl and an alkenyl group having one to six carbon atoms and an aryl group, with cement and water so that the resultant mixture contains from 0.2 to 100 kg. of expanded styrene polymer and from 25 to 1000 kg. of cement per cubic meter, molding said mixture and allowing it to set, said particles of expanded styrene polymers being coated with 0.1 to 10 kg. of said organosiloxanol per cubic meter of said mixture.

2. A process as claimed in claim 1 wherein the mixture contains 10 to 2000 kg. of aggregate per cubic meter of the mixture.

3. A process as claimed in claim 1 wherein the particles of the expanded styrene polymer have a mean diameter of about 0.1 to 20 mm. and a density of from 10 to 100 kg./m.$^3$.

4. A process as claimed in claim 2 wherein the particles of the expanded styrene polymer have a mean diameter of about 0.1 to 20 mm. and a density of from 10 to 100 kg./m.$^3$.

References Cited

UNITED STATES PATENTS

| | | | |
|---|---|---|---|
| 2,806,509 | 9/1957 | Bozzacco et al. | 260—2.5 |
| 3,086,885 | 3/1963 | John | 117—100 |
| 3,214,393 | 10/1965 | Sefton | 260—2.5 |

MURRAY TILLMAN, *Primary Examiner.*

SAMUEL BLECH, *Examiner.*

J. T. GOOLKASIAN, *Assistant Examiner.*

UNITED STATES PATENT OFFICE
CERTIFICATE OF CORRECTION

Patent No. 3,361,688              January 2, 1968

Eckhard Bonitz et al.

It is certified that error appears in the above identified patent and that said Letters Patent are hereby corrected as shown below:

Column 1, lines 67 to 72, the formula should appear as shown below:

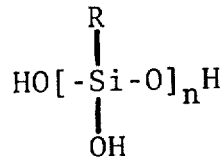

Signed and sealed this 25th day of November 1969.

(SEAL)
Attest:

Edward M. Fletcher, Jr.
Attesting Officer

WILLIAM E. SCHUYLER, JR.
Commissioner of Patents